United States Patent [19]

Hakert et al.

[11] 4,178,200

[45] Dec. 11, 1979

[54] PRESSURE ROLL FOR JACKETING STEEL PIPES WITH THERMOPLASTIC STRIP

[75] Inventors: Karl-Heinz Hakert, Mülheim; Walter Quitmann, Angermund, both of Fed. Rep. of Germany

[73] Assignee: Mannesmann Aktiengesellschaft, Dusseldorf, Fed. Rep. of Germany

[21] Appl. No.: 884,969

[22] Filed: Mar. 9, 1978

[30] Foreign Application Priority Data

Sep. 3, 1977 [DE] Fed. Rep. of Germany ....... 2710705

[51] Int. Cl.² ...................... B65H 81/00; B21B 31/08
[52] U.S. Cl. ..................................... 156/187; 29/132
[58] Field of Search ...................... 156/185, 187, 188; 29/130, 132, 123

[56] References Cited

U.S. PATENT DOCUMENTS

| 1,997,442 | 4/1935 | Walsh | 29/130 UX |
| 2,248,191 | 7/1941 | Pratt | 29/130 UX |
| 2,997,406 | 8/1961 | Freeman et al. | 29/130 X |
| 3,401,439 | 9/1968 | Staats et al. | 29/130 |
| 3,460,221 | 8/1969 | Korch | 29/132 X |
| 3,686,731 | 8/1972 | Koori et al. | 29/132 |
| 3,691,949 | 9/1972 | Giori et al. | 29/130 X |
| 3,786,549 | 1/1974 | Pott | 29/132 X |
| 4,078,286 | 3/1978 | Takaguichi | 29/132 |

FOREIGN PATENT DOCUMENTS

| 1901245 | 8/1970 | Fed. Rep. of Germany | 156/187 |
| 5154676 | 5/1976 | Japan | 156/187 |

Primary Examiner—David A. Simmons
Attorney, Agent, or Firm—Smyth, Pavitt, Siegemund, Jones & Martella

[57]     ABSTRACT

A roll or roller for urging extruded thermoplastic strip onto an axially advancing, rotating pipe is constructed from a silicon rubber core with a shore hardness of 40 and having a softer silicon rubber jacket with a shore hardness not exceeding 30. The core is traversed by axial bores.

6 Claims, 3 Drawing Figures

PRESSURE ROLL FOR JACKETING STEEL PIPES WITH THERMOPLASTIC STRIP

BACKGROUND OF THE INVENTION

The present invention relates to jacketing steel pipes and more particularly the invention relates to a roller for pressing thermoplastic strips onto the surfaces of steel pipes for purposes of jacketing them by helically wrapping such strips around the pipe.

Steel pipes are jacketed for example in that a freshly extruded polyethylene strip is wound helically upon an axially movable and rotating pipe. An adhesive is also applied to the pipe in that a ribbon made of highly vicous, adhesive material is also freshly extruded and wrapped around the pipe to be located between the pipe's surface and the polyethylene strip. See e.g. U.S. Pat. Nos. 3,616,006 and 3,823,045.

Generally speaking, these known methods wind strip material in overlaying loops and the strip is forced against the pipe's surface by means of solid, plastic rolls or rollers for purposes of welding the edges of the strip and for smoothing the surface contour of the overlap.

German printed patent application No. 1,901,245 discloses a basically similar method but for jacketing corrugated tubes. The strip is forced against the tube's surface by means of an air filled rather soft hose being supported by pulleys in surface portions facing away from the tube. This hose is made from a heat resisting material such as silicon rubber and runs like a pulley while being driven by the rotating tube. The hose conforms to the contour of the corrugated tube and forces the strip material onto the ridges as well as into the valleys of the corrugation. However, the invention does not relate to such a device.

It has been found, that the known pressure rolls do not perform adequately. For example, it was found that they do not completely avoid the inclusion of air bubbles between the pipe's surface and the strip material.

DESCRIPTION OF THE INVENTION

It is an object of the present invention to improve the pressing of thermoplastic strip material onto the surface of a steel pipe without inclusion of air bubbles and in a manner that permits smoothing the surface in spite of surface unevennesses such as welding seams, etc.

In accordance with the preferred embodiment of the invention it is suggested to use a roll or roller for urging thermoplastic strip unto a steel pipe, to be constructed from a cylindrical silicon rubber core on a shaft and preferably with a shore hardness of about 40. The core carries a softer silicon rubber jacket of a shore hardness not exceeding 30. Preferably bores traverse the core axially.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
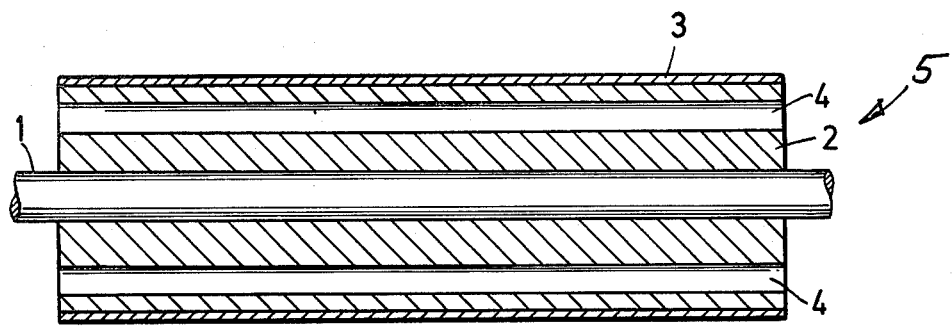
FIG. 1 is a longitudinal section view through a roller in accordance with the present invention.
Figure 2:
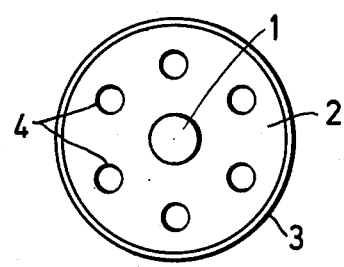
FIG. 2 is a front end view of the roller shown in FIG. 1.
Figure 3:
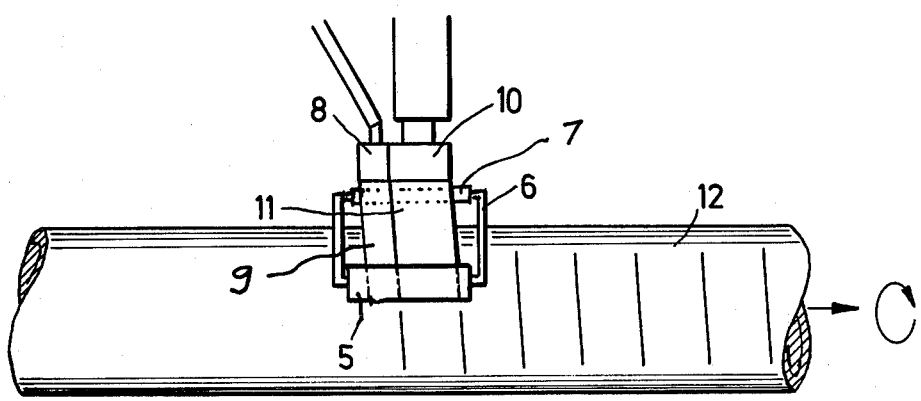
FIG. 3 shows a side view of a strip winding station which includes a roller as shown in FIGS. 1 and 2.

Proceeding now to the detailed description of the drawings, the figures show a roll or roller 5 having an elastic cylindrical core 2 which has been cast around a shaft 1. The core 2 is made of silicon rubber with a shore hardness of about 40; and a diameter of about 30 mm. The core 2 carries a jacket layer or coating of about 2 mm thickness which is made of a softer silicone rubber, having a shore hardness of about 30. The jacket 3 has resulted from casting around the core.

In order to increase the resiliency and elasticity of the roller body, axially extending bores 4 are provided in body 2. This roller is used in a pipe jacketing station to be explained briefly next.

A steel pipe 12 is to be jacketed and an extruder 10 provides a polyethylene strip 11 on a continuous basis. The pipe 12 moves axially and rotates on its axis so that the strip is helically wrapped around the pipe 12 as it passes the extruder. A second extruder 8 extrudes an adhesive ribbon 9 onto the pipe, ahead of the extrusion strip 11. The pipe may have been preheated to about 220° C. to enhance adhesion.

A frame 6 is provided to journal the pressure roll 5 which urges both strips 9,11 onto the pipe whereby strip 11 is urged onto a loop of adhesive strip 9 which was laid down on the preceeding rotational passage of that portion of the pipe. The roller 7 on frame 6 is provided to particularly position the strips as they emerge from the extruders in relation to a tangent on the pipe.

The resiliency of the roller is such that the softer jacket more readily conforms to surface unevenness. On the other hand, the harder contour of the roller ensures a general smoothing of the jacketed pipe's surface so that any air bubbles are forced out in forward direction as to the helical advance of the pipe, and as the strips are being laid.

The invention is not limited to the embodiments described above but all changes and modifications thereof not constituting departures from the spirit and scope of the invention are intended to be included.

We claim:

1. Pressure roller for forcing a thermoplastic ribbon, strip or the like onto the surface of a rotating and axially moving steel pipe, comprising:
    a shaft;
    a cylindrical core on the shaft, made of sillicone rubber: and
    a jacket on the core, made also of silicone rubber but being softer than the core.

2. Roller as in claim 1, said core having a shore hardness of about 40, the jacket having a shore hardness not exceeding 30.

3. Roller as in claim 1, said core having a plurality of axially extending bores, traversing the core axially entirely and being arranged around the shaft.

4. In a method for helically winding thermoplastic strip onto an axially advancing rotating steel pipe, the step of urging the strip onto the pipe by means of a roller having a silicone rubber core and a softer silicone rubber jacket.

5. The method as in claim 4, using a roller whose core is traversed by axial bores.

6. In an apparatus for helically winding thermoplastic strip onto an axially advancing rotating steel pipe, a pressure roller for forcing the strip onto the surface of the pipe the roller comprising:
    a shaft;
    a cylindrical core on the shaft, made of silicone rubber; and
    a jacket on the core, made also of silicone rubber but being softer than the core.

* * * * *